United States Patent [19]
Newton

[11] Patent Number: 5,881,634
[45] Date of Patent: Mar. 16, 1999

[54] TWO-SIDED COOKING SYSTEM WITH LASER MARKINGS

[75] Inventor: Robert K. Newton, Beloit, Wis.

[73] Assignee: Taylor Company, Rockton, Ill.

[21] Appl. No.: 837,687

[22] Filed: Apr. 21, 1997

[51] Int. Cl.[6] .............................. A47J 27/62; A47J 37/04; A47J 37/06
[52] U.S. Cl. ................................ 99/349; 99/372; 99/379; 219/121.68
[58] Field of Search .............................. 99/349, 353–355, 99/432, 372–380, 422–426, 389, 390, 391, 394; 219/121.2, 121.26, 121.3, 121.62, 121.68, 121.69, 121.78, 121.81, 524, 525; 425/136, 151, 160, 298; 430/300, 141, 175, 177; 438/708, 34.4; 358/297, 456, 458; 347/225; 606/5; 426/496, 512

[56] References Cited

U.S. PATENT DOCUMENTS

| | | |
|---|---|---|
| 1,031,085 | 7/1912 | Nuubson . |
| 3,636,251 | 1/1972 | Daly et al. ...................... 219/121.62 X |
| 3,701,880 | 10/1972 | Rively ................................... 219/121.2 |
| 3,920,951 | 11/1975 | Chovan et al. ....................... 219/121.6 |
| 4,248,959 | 2/1981 | Jeffers et al. ........................... 430/300 |
| 4,444,094 | 4/1984 | Baker et al. . |
| 4,567,819 | 2/1986 | Adamson . |
| 4,568,428 | 2/1986 | Adamson . |
| 4,627,335 | 12/1986 | Sherman et al. . |
| 4,878,424 | 11/1989 | Adamson . |
| 5,132,914 | 7/1992 | Cahlander et al. . |
| 5,172,328 | 12/1992 | Cahlander et al. . |
| 5,310,989 | 5/1994 | Russell et al. ...................... 219/121.68 |
| 5,341,727 | 8/1994 | Dickson . |
| 5,376,395 | 12/1994 | Pels . |
| 5,467,693 | 11/1995 | Van den Berghe . |
| 5,531,155 | 7/1996 | Pellicane et al. . |

OTHER PUBLICATIONS

Patent Application for Two Sided Cooking Apparatus Having An Electronic Gap Adjustment Mechansim; Inventor Newton, et al.; Attorney Docket No. 52848–106, Apr. 21, 1997.

*Primary Examiner*—Timothy F. Simone
*Attorney, Agent, or Firm*—Foley & Lardner

[57] ABSTRACT

A clamshell or two-sided cooking system utilizes an upper platen and a lower platen. The periphery of the upper platen is marked on the lower platen by a laser-etched marking. The laser-etched marking provides a wear resistant marking which withstands the scraping and scrubbing operations associated with using and cleaning the clam cooking system. The laser-etched markings are preferably comprised of a plurality of slanted lines disposed 1/16 of a inch apart.

20 Claims, 4 Drawing Sheets

TWO-SIDED COOKING SYSTEM WITH LASER MARKINGS

FIELD OF THE INVENTION

The present invention relates generally to a cooking system. More particularly, the present invention relates to platens or plates used in a cooking system.

BACKGROUND OF THE INVENTION

Two-sided cooking apparatus or clamshell cooking systems are capable of simultaneously cooking two sides of various food products, such as, hamburger patties, sausage patties, chicken, or other foodstuffs. Clamshell cooking systems are often utilized in the fast-food industry because they reduce the overall cooking time associated with the foodstuffs, such as, frozen hamburger patties, and the amount of operator attention required for cooking the foodstuffs.

The clamshell cooking system generally includes an upper cooking plate or platen and a lower cooking plate or platen. The upper cooking platen is coupled to a platen support arm for swinging movement between a lower cooking position overlying the lower cooking platen and a raised position inclined upwardly from the lower cooking platen. The upper cooking platen can be manually or automatically moved between the lower cooking position and the raised stand-by position. The lower cooking position can be adjusted for various sizes and thicknesses of foodstuffs.

The upper cooking platen generally has a smaller area than the lower cooking platen. The lower cooking platen has a larger area so that other foods which do not require two-sided cooking can be simultaneously cooked, while other foodstuffs are cooked between the upper and lower platens. Furthermore, the additional area provided by the lower cooking platen can still be utilized to cook foodstuffs when the upper platen is in the raised position. For example, the lower cooking platen can be used to warm buns or rolls or to fry eggs, onions, potatoes, meats, or other foodstuffs. Thus, a two-sided cooking area is located between the upper cooking platen and the lower cooking platen when the upper cooking platen is in the lower cooking position. At the same time, a one-sided cooking area outside the two-sided cooking area is always located on the lower cooking platen, regardless of the position of the upper cooking platen.

When cooking foodstuffs between the upper cooking platen and the lower cooking platen, the operator must place the foodstuffs within the two-sided cooking area on the lower platen (e.g., beneath the upper platen when the upper platen is in the lower cooking position). This operation can be somewhat difficult when the operator is trying to place as many foodstuffs as can fit in the two-sided cooking area. If the operator accidently places the foodstuffs outside of the two-sided cooking area, the food stuff may not be cooked properly.

Heretofore, the two-sided cooking area on the lower platen was marked by sandblasting a pattern on the top surface of the lower cooking platen. The sandblasting operation removes a portion of the top surface to make a mark in the sheen of the lower platen. However, the sandblasted pattern is susceptible to wear due to the scraping associated with removing foodstuffs from the grill with a spatula or other utensil. Additionally, the sandblasted pattern can be worn by scrubbing operations associated with the cleaning of the lower platen.

Thus, there is a need for a marking for a two-sided operation which is not susceptible to wear. Further, there is a need for a lower cooking platen which has a durable marking outlining the periphery of the upper cooking platen.

SUMMARY OF THE INVENTION

The present invention relates to a lower cooking platen for use in a clamshell cooking apparatus. The clamshell cooking apparatus includes an upper cooking platen movable to an upper position and to a lower cooking position. The lower cooking platen includes a top surface including a marking. The marking is laser-etched into the top surface. The laser-etched marking provides a wear-resistant visual indicia on the top surface.

The present invention further relates to a two-sided cooking system including a upper cooking plate, a lower cooking plate, and a support arm. The lower cooking plate has a top surface with a laser-etched marking. The support arm is coupled to the upper cooking plate. The support arm is capable of holding the upper cooking plate in a first position and a second position. The upper cooking plate and the lower cooking plate cooperate to cook a food between the upper cooking plate and the lower cooking plate when in the first position.

The present invention still further relates to a clamshell cooking apparatus, including an upper cooking platen and a lower cooking platen. The upper cooking platen is movable to an upper position and to a lower cooking position. The improvement includes a top surface including a marking. The marking is laser-etched into the top surface. The laser-etched marking provides a wear resistant visual indicia on the top surface.

According to one exemplary aspect of the present invention, the clamshell cooking system includes two upper cooking platens and one lower cooking platen. Markings indicate the periphery of the upper cooking platens on the top surface of the lower cooking platen. The markings preferably indicate the corners of the rectangular-shaped upper cooking platens.

In accordance with another exemplary embodiment of the present invention, the laser mark is comprised of slanted ⅙ of an inch lines spaced ¹⁄₁₆ of an inch apart and oriented at a 45 degree angle. The markings can be etched below the top surface of the lower cooking platen at a distance from 0.0005 inches to 0.003 inches. The laser is preferably a Neodymium: Yttrium Aluminum Garnet laser marking. The laser markings preferably remove 0.001 inches of the material from the top surface and extend at least another 0.001 inches into the top surface.

The laser markings advantageously are resistant to wear because the markings extend into the top surface of the lower platen. The markings do not solely rely on removal of material from the top surface and, therefore, do not interfere with the grilling operation of the cooking apparatus. The lower platen is preferably a steel material, and the markings preferably have a grey color. The laser-etched markings can also be utilized to mark the placement of apparatus associated with the clamshell cooking system, such as, thermal couple devices, sensors or other devices.

BRIEF DESCRIPTION OF THE DRAWINGS

The invention will hereafter be described with reference to the accompanying drawings, wherein like numerals denote like elements.

DETAILED DESCRIPTION OF THE PREFERRED EMBODIMENTS

Figure 1:
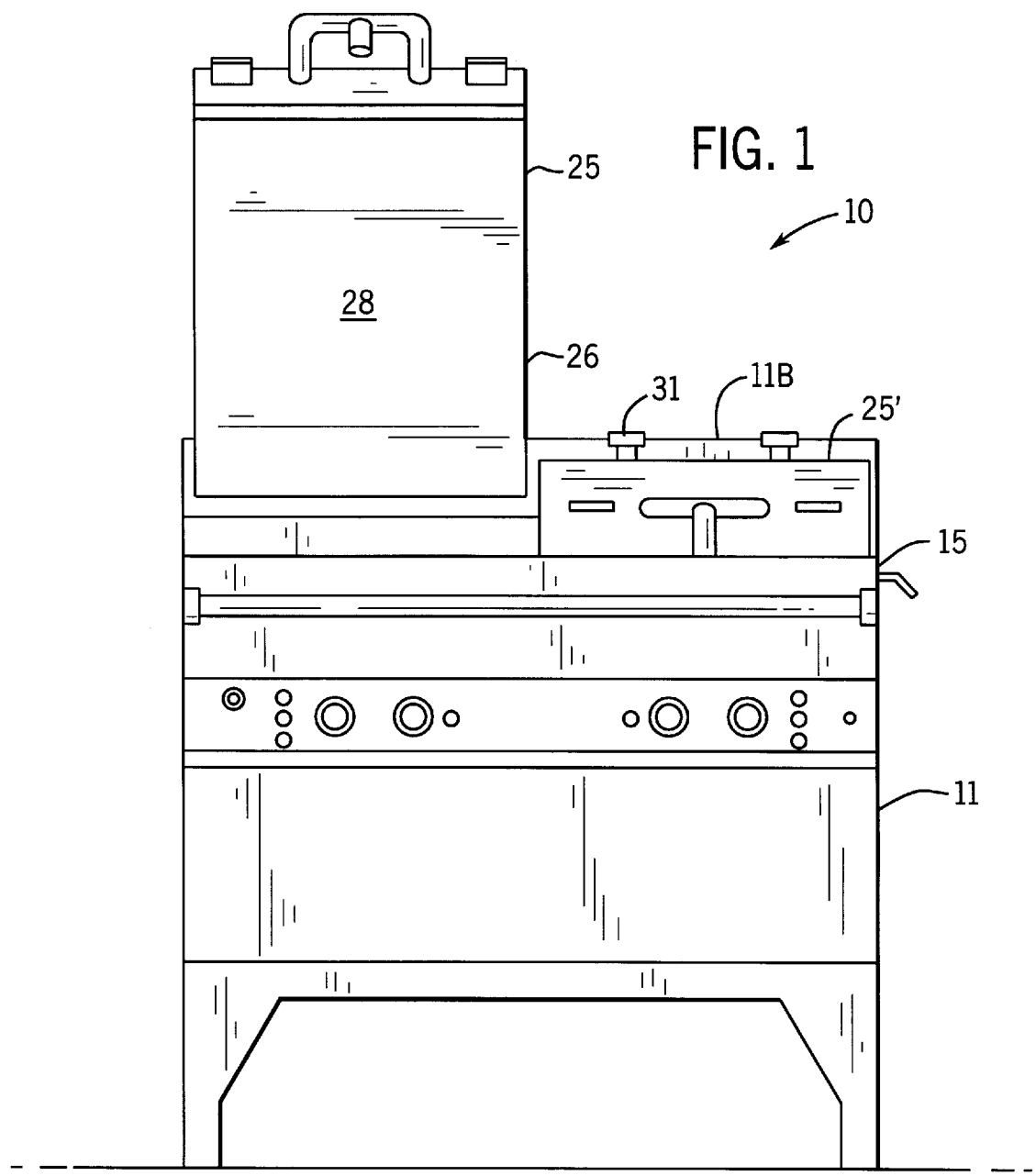
FIG. 1 is a front view of the cooking apparatus having dual upper cooking platens, with one upper cooking platen in a raised cooking position and the other upper cooking platen in a lower cooking position.
Figure 2:
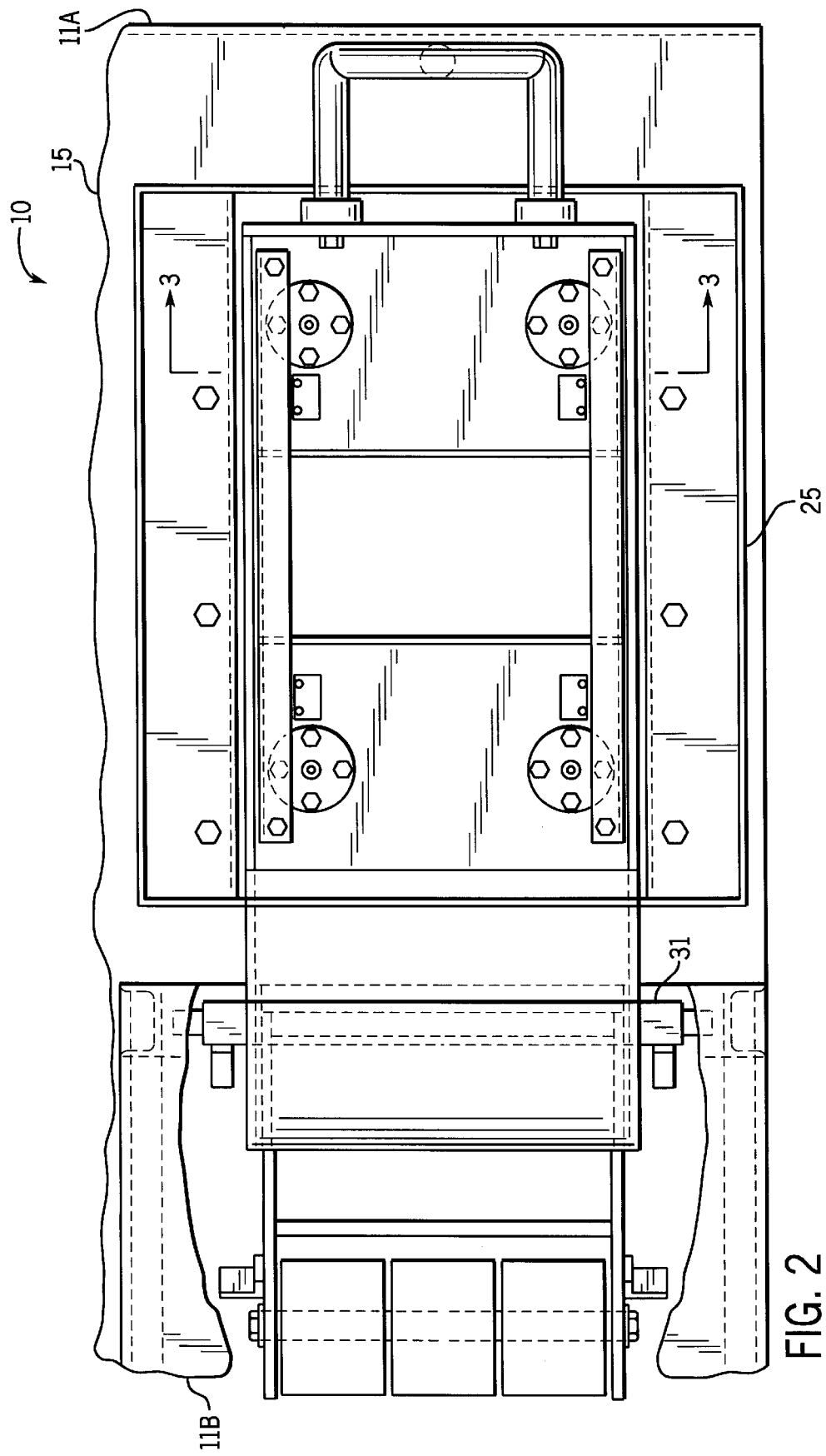
FIG. 2 is a fragmentary horizontal sectional view through the upper cooking platen.
Figure 3:
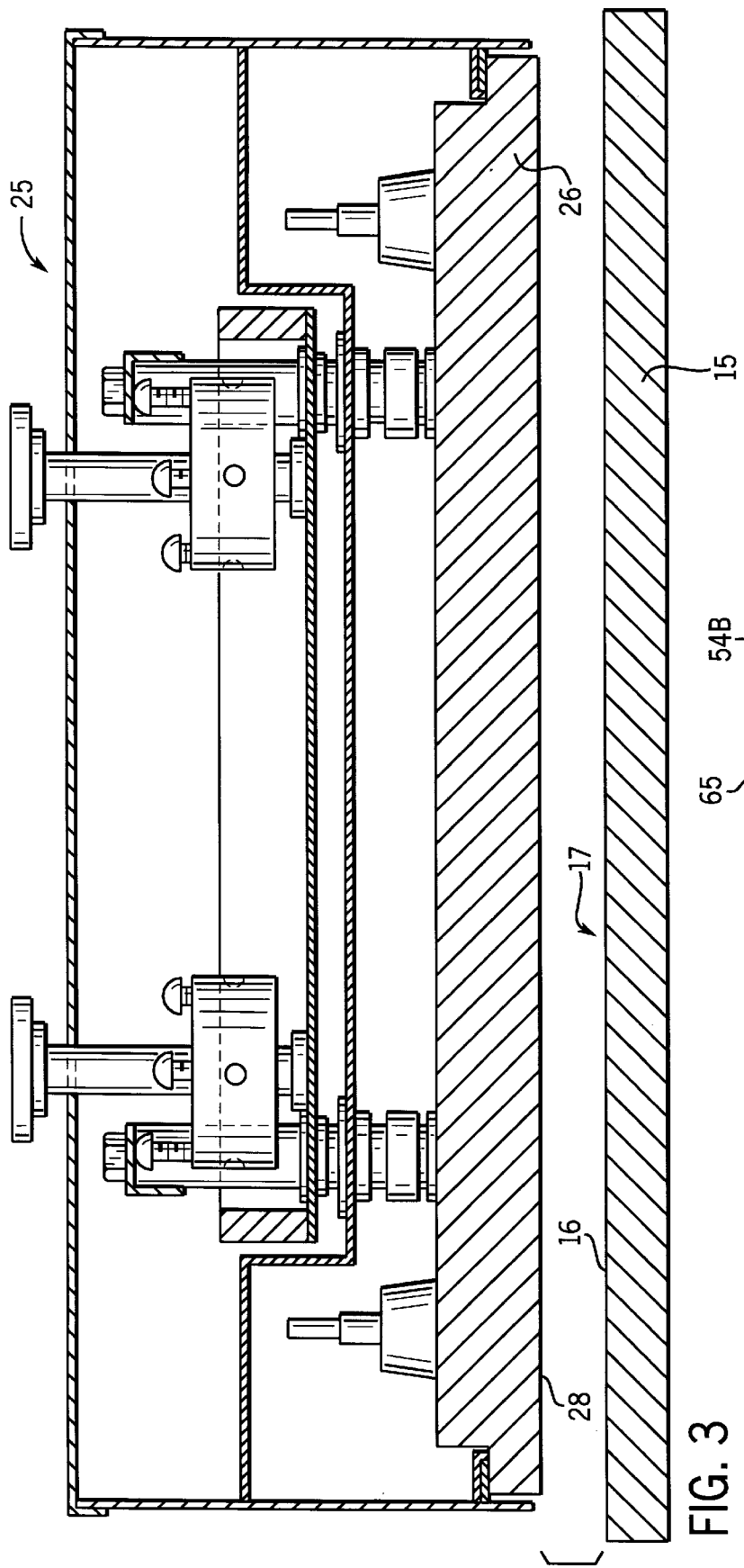
FIG. 3 is a fragmentary transverse sectional view taken on the plane 3—3 of FIG. 2, illustrating the parts on a larger scale than FIG. 2.
Figure 4:
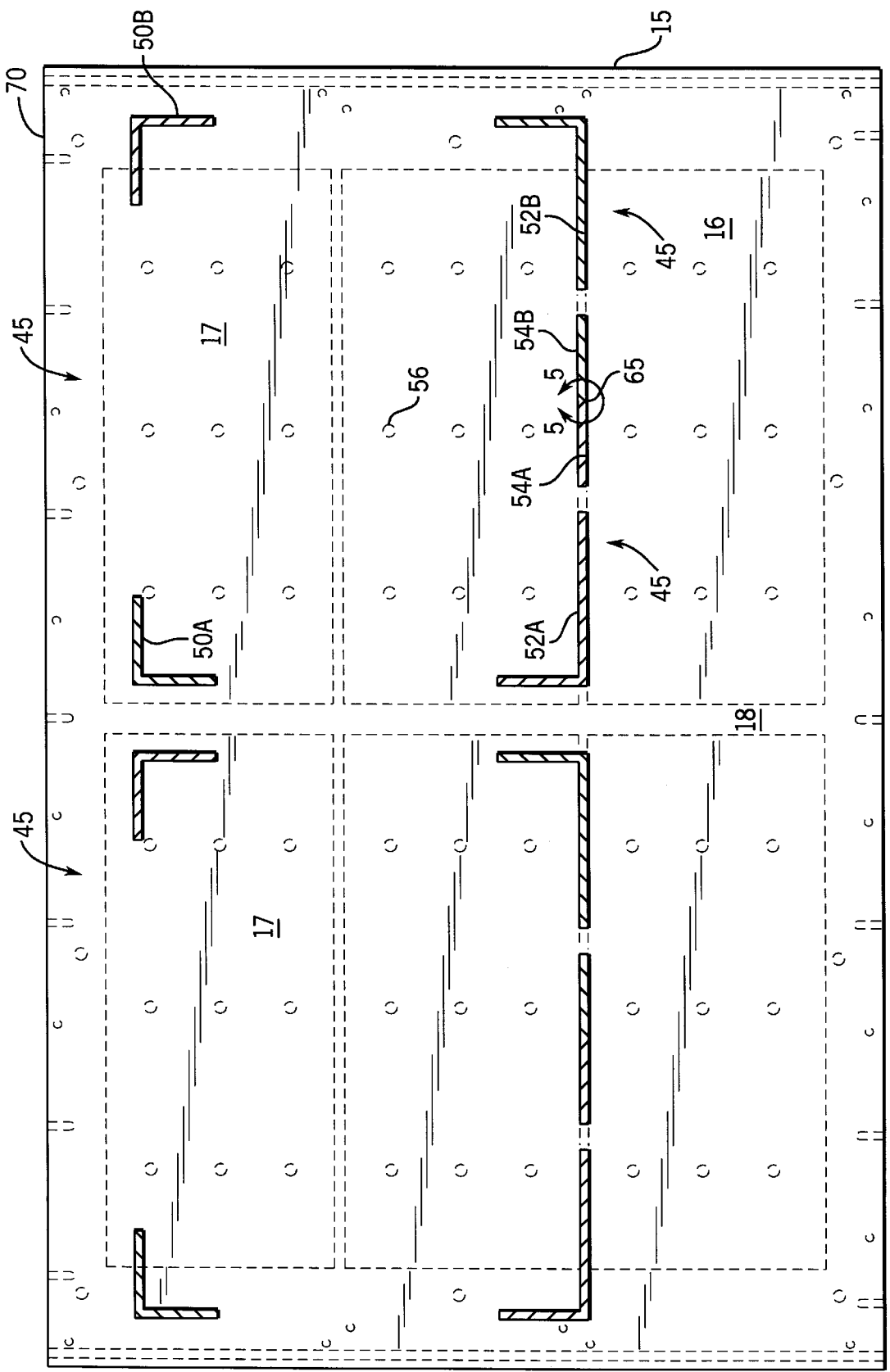
FIG. 4 is a top view of the lower cooking platen illustrated in FIG. 1, including laser-etched markings in accordance with an exemplary aspect of the present invention.

With reference to FIGS. 1–3, a two-sided cooking system or clamshell grill apparatus 10 includes a ridged support structure 11 having a front 11A (FIG. 2) and a rear 11B. Structure 11 supports a lower cooking platen 15 formed of a heat-conducting material, such as, a steel plate. Platen 15 can be manufactured from cast aluminum abrasion-resistent steel, cast iron, stainless steel, mild steel, a ceramic material, or a metal material. Platen 15 is preferably ¾ of an inch thick, 38 inches wide, and 24 inches deep (FIG. 4). Although platen 15 is shown having a rectangular shape, platen 15 can be a variety of shapes and dimensions.

With reference to FIG. 1, two movable upper cooking platens 25 and 25' are disposed in a side-side relation, each having a width slightly less than one-half of the width of lower cooking platen 15. Upper cooking platen assemblies 25 and 25' prime are of like construction and of like numerals and are used to designate corresponding parts. Alternatively, a single upper cooking platen (not shown) assembly could be used. Each of upper platen assemblies 25 and 25' includes an upper cooking platen 26 formed of heat-conducting material, such as, a cast aluminum plate, with a flat smooth cooking surface at an underside 28 and with heating elements (not shown) in communication with platen 26. Platen 26 is rectangular, has a width of 16.5 inches, and has a depth of 13 inches.

The materials associated with upper platen 26 and with lower platen 15 are not given in a limiting fashion. Any type of appropriate heating surface can be utilized.

Platen assemblies 25 and 25' are each mounted on a ridged platen support arm 31 (FIG. 2) for swaying movement about an axis between a lower cooking position (assembly 25' in FIG. 1) and an upper cooking position (assembly 25 in FIG. 1. Alternative support arms can be utilized. For example, swivels, pivots, automated systems, or other devices can be utilized to lower upper platen assemblies 25 and 25'.

When platen assembly 25 is in the lower cooking position, the periphery of platen 26 defines a two-sided cooking area 17 (FIG. 4). With reference to FIG. 4, top surface 16 of lower cooking platen 15 includes two-sided cooking area 17 and a one-sided cooking area 18. Two-sided cooking area 17 is designated by markings 45, which are comprised of individual markings 50, 52, and 54. Additionally, top surface 16 can include a circular marking 56, indicating a place for a thermal couple sensor disposed in platen 15. One-sided cooking area 18 is generally exclusive of area 17 and can be used to cook food when assemblies 25 and 25' are in the upper and lower cooking positions.

Markings 50 and 52 preferably designate the corners of the periphery of upper platen 26. Markings 50 and 52 are formed at right angles and include laser etchings disposed at a 45 degree angle in a single direction. Although outlines of markings of 50A, 50B, 52A, 52B, 54A and 54B are shown in FIG. 4, outlines are not provided.

Figure 5:
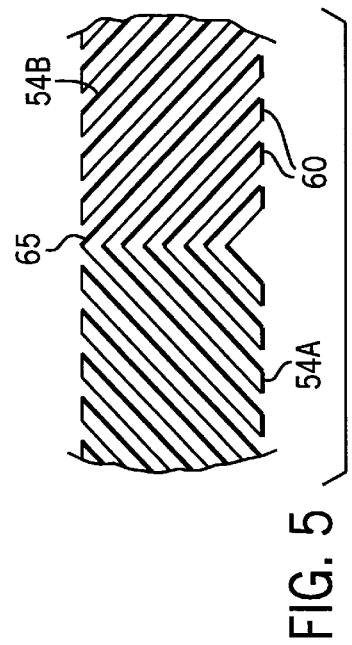
FIG. 5 is an enlarged view of the laser-etched markings illustrated in FIG. 4 in accordance with another exemplary embodiment in the present invention.

With reference to FIG. 5, each of markings 50A, 50B, 52A and 52B, 54A, and 54B are comprised of diagonal lines 60 disposed at a 45 degree angle. Each line 60 is $\frac{1}{16}$ of an inch thick and is spaced $\frac{1}{16}$ of an inch from each other. Each line 60 has a length of 0.35 inches (each of markings 50A, 50B, 52A, 52B, 54A, and 54B has a height or a width of ¼ inch). Lines 60 are disposed in a first direction in markings 50A, 52A and 54A. Line 60 of markings 50B, 52B, and 54B are disposed in a second direction opposite the first direction. At a junction 65 (FIGS. 4 and 5) associated with markings 54A and B, lines 60 meet in a right angle fashion.

Markings 50A and 50B are spaced approximately 11.5 inches from each other at their closest points, are 2.5 inches long in a direction parallel to edge 70, and are 2.5 inches long in a direction perpendicular to edge 70. Markings 52A and B are 6.5 inches from each other at their closest points, extend five inches in a direction parallel to edge 70, and extend 2.5 inches in a direction perpendicular to edge 70. Marking 54A extends 2.5 inches in a direction parallel to edge 70 and is ¾ of an inch from marking 52A. Similarly, marking 54B is ¾ of an inch 2.5 inch from marking 52B and extends 2.5 inches in a direction parallel to edge 70.

Alternatively, all of two-sided cooking area 17 can be etched to provide a definitive visual indication to appropriately place foodstuffs in system 10. Further, other shaped markings other than the specific embodiment shown as markings 50A, 50B, 52A, 52B, 54A, and 54B can be utilized. For instance, markings for the placement of each burger patty in area 17 could be provided. Further, although a circular marking 56 is shown for a thermal couple location, other shapes can be utilized.

Laser markings 45 are preferably made with a Neodymium: Yttrium Aluminum Garnet laser, such as, those provided by XL/Control Laser, Inc., 7503 Chancellor Drive, Orlando, Fla. 32809. Laser markings 45 preferably remove 0.001 inches from top surface 16 of platen 15 and extend an additional 0.001 inches into platen 15. Markings 45 can extend from a range of 0.005 inches to 0.003 inches into top surface 16 of platen 15. Laser-etched markings 45 can also be provided on upper platen 26.

Markings 45 preferably provide a grey-colored visual indication of area 17 on the shiny top surface 16 of platen 15. Line 60 can be replaced by other shapes, such, as circles, squares, dashes, or other symbols.

It is understood that, while the detailed drawings, specific examples, and particular component values given provide a preferred exemplary embodiment of the present invention, it is for the purpose of illustration only. The apparatus of the invention is not limited to the precise details and conditions disclosed. For example, although lines disposed at a 45 degree angle comprise the laser-etched markings, the laser-etched markings can be made of a variety of symbols, and shapes. Further, although a particular clamshell-type cooking apparatus is shown, other cooking apparatuses could utilize the laser-etched markings of the present invention. Various changes may be made to the details disclosed without departing from the spirit of the invention which is defined by the following claims.

What is claimed is:

1. A two-sided cooking system, comprising:
   an upper cooking plate;
   a lower cooking plate having top surface with a laser-etched marking; and
   a support arm coupled to the upper cooking plate, the support arm being capable of holding the upper cooking plate in a first position and a second position, the upper cooking plate and the lower cooking plate cooperating to cook a food between the upper cooking plate and the lower cooking plate when in the first position, wherein the marking indicates a cooking area for the food.

2. The two-sided cooking system of claim 1 wherein the marking includes a plurality of line arranged as to a right angle.

3. The two-sided cooking system of claim 1, wherein the top surface is marked by a Neodymium: Yttrium Aluminum Garnet laser.

4. The two-sided cooking system of claim 3 wherein the marking extends at least 0.001 inches into the top surface.

5. The two-sided cooking system of claim 1 wherein the marking indicates a cooking area between the upper cooking plate and the lower cooking plate when in the first position.

6. The two-sided cooking system of claim 5 wherein the upper cooking plate and the lower cooking plate are rectangular and the marking indicates a position of corners of the upper cooking platen when in the first position.

7. A two-sided cooking system comprising:

an upper cooking platen movable to an upper position and a lower cooking position;

a support arm coupled to the upper cooking platen; and a lower cooking platen coupled to the support arm and having a top surface including a marking, the marking being laser-etched into the top surface, the marking providing visual indicia of an area for cooking food between the upper cooking platen and the lower cooking platen, whereby the laser-etched marking provides wear-resistant visual indicia on the top surface.

8. The cooking system of claim 7, wherein the top surface is marked by a Neodymium: Yttrium Aluminum Garnet laser.

9. The cooking system of claim 8, wherein the marking extends at least 0.001 inches into the top surface.

10. The cooking system of claim 9, wherein the marking extends no more than 0.004 inches into the top surface.

11. The cooking system of claim 9, wherein the marking extends no more than 0.002 inches into the top surface.

12. The cooking system of claim 7, wherein the marking indicates a cooking area between the upper cooking platen and the lower cooking platen when the upper cooking platen is in the lower cooking position.

13. The cooking system of claim 12, wherein the marking indicates a position of corners of the upper cooking platen when in the lower cooking position.

14. The cooking system of claim 7, wherein the marking indicates a position of a thermocouple device.

15. The cooking system of claim 14, wherein the marking is circular.

16. A two-sided cooking system including an upper cooking platen and a lower cooking platen having a top surface, the upper cooking platen being movable to an upper position and to a lower cooking position, the improvement comprising;

a marking being laser-etched into the top surface, the marking providing visual indicia of a cooking position on the top surface, whereby the laser etched marking provides a wear-resistant visual indicia on the top surface.

17. The improvement of claim 16, wherein the marking indicates a position of a thermocouple device.

18. The improvement of claim 17, wherein the marking is circular.

19. The improvement of claim 16, wherein the marking extends no more than 0.002 inches into the top surface.

20. The improvement of claim 16, wherein the marking indicates a cooking area between the upper cooking platen and the lower cooking platen when in the lower cooking position.

* * * * *